Figure 1:
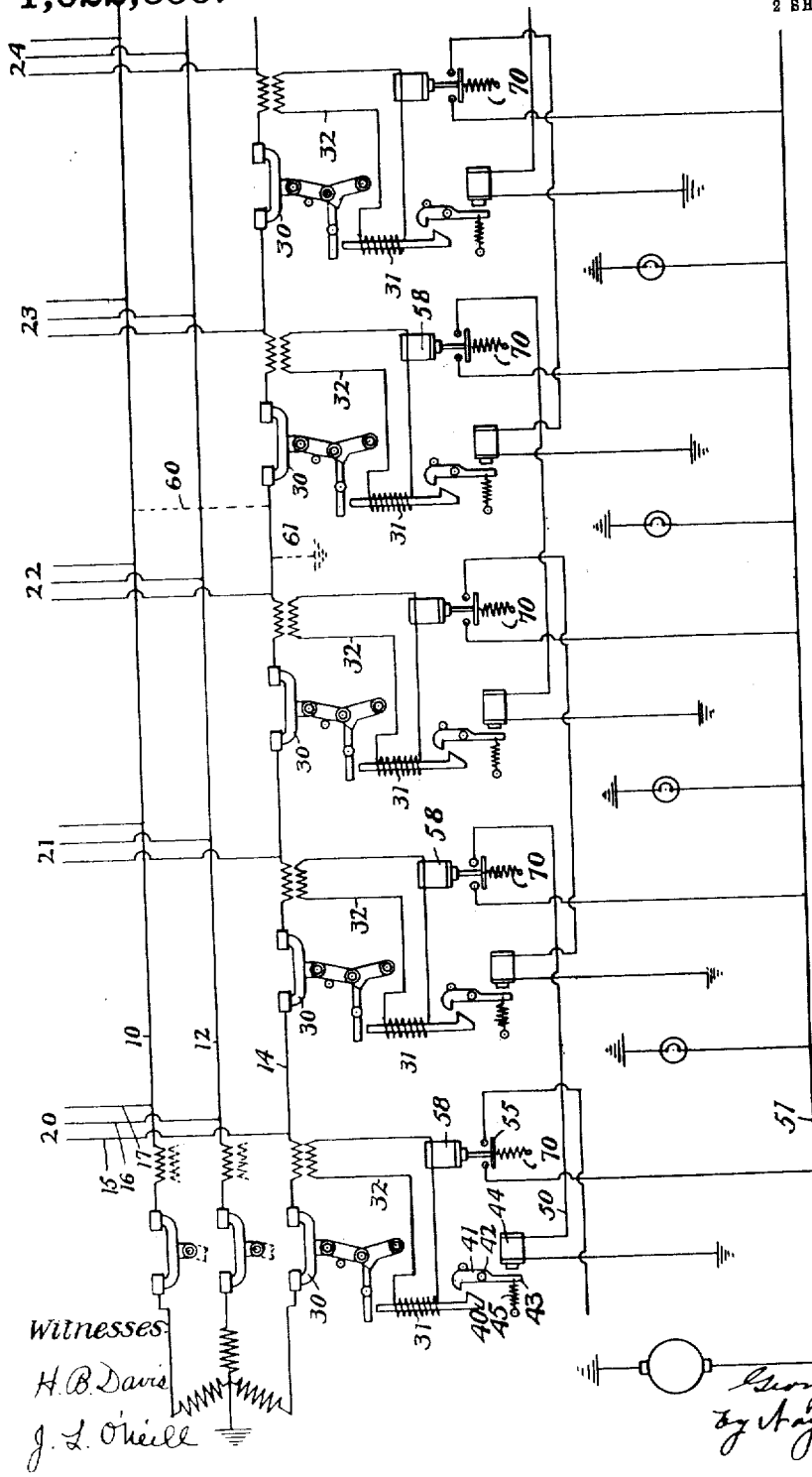

G. A. BURNHAM.
PROTECTING MEANS FOR ELECTRICAL DISTRIBUTION SYSTEMS.
APPLICATION FILED OCT. 28, 1911.

1,022,355.

Patented Apr. 2, 1912.
2 SHEETS—SHEET 1.

Witnesses
H. B. Davis
J. L. O'Neill

Inventor:
George A. Burnham
by Hayes & Harriman
attys.

UNITED STATES PATENT OFFICE.

GEORGE A. BURNHAM, OF SAUGUS, MASSACHUSETTS, ASSIGNOR TO S. B. CONDIT, JR., OF BOSTON, MASSACHUSETTS.

PROTECTING MEANS FOR ELECTRICAL DISTRIBUTION SYSTEMS.

1,022,355. Specification of Letters Patent. Patented Apr. 2, 1912.

Application filed October 28, 1911. Serial No. 657,319.

*To all whom it may concern:*

Be it known that I, GEORGE A. BURNHAM, a citizen of the United States, residing at Saugus, in the county of Essex and State of Massachusetts, have invented an Improvement in Protecting Means for Electrical Distribution Systems, of which the following is a specification.

This invention relates to protecting means for electrical-distribution systems, whereby in case of an overload or abnormal condition of the circuit or fault which results in an overload, a switch will be operated to open the circuit. Heretofore overload switches have been controlled by tripping-magnets operated directly or indirectly by an overload; and time-limit relays have been employed for controlling the operation of the tripping-magnets so that all of the overload switches will not be operated and the entire service discontinued.

My present invention involves a different principle of control for the tripping-magnets, whereby the employment of time-limit relays is avoided, yet only one overload switch will be operated to open the circuit, thereby to maintain continuity of the service and at the same time afford adequate protection.

My present invention involves the employment at each sub-station of an overload switch and a tripping-magnet therefor, which is responsive to an overload, and means to prevent the tripping-magnet from operating to cause the over-load switch to open the circuit which is controlled by means located at the next sub-station, and which is responsive to an overload, but more quickly responsive than the tripping-magnets. Upon the occurrence of an overload all those tripping-magnets which ordinarily would respond are prevented from operating, with the exception of that one which is controlled by means located at a sub-station or place beyond the cause of the overload, whereupon that tripping-magnet will respond to the overload and cause its overload-switch to open the circuit.

In carrying out my invention locking-means are provided for the armatures of the tripping-magnets adapted, when operated, to engage and hold said armatures in retracted positions, thereby to prevent the magnets from operating, and local-magnets are provided to operate said locking-means, the circuits of which extend to the next sub-stations. Said local-magnet circuits are controlled by magnets connected in series relation with the tripping-magnets in the usual transformer circuits, but said controlling-magnets are constructed so as to respond more quickly to an overload than the tripping-magnets, as for instance they may be smaller than the tripping-magnets, so that upon the occurrence of an overload they will operate to cause the locking-means to engage the armatures of the tripping-magnets or means moved by said armatures, before the tripping-magnets will respond and thus prevent said tripping-magnets from responding. However, in case the locking-means of any of the tripping-magnets is not operated, then such tripping-magnet is free to respond and will do so if influenced by the overload, as for instance, when the controlling-magnet of any of the locking-means is beyond the cause of the overload, then its locking-means will not be operated, and the corresponding tripping-magnet is free to respond to the overload, and will do so and operate its overload-switch and open the circuit, and all the other tripping-magnets between said place and the source of supply will be prevented from operating, so that the continuity of the circuit between said place and the source of supply is maintained. Upon the cessation of the overload the controlling-means for the locking-means will be automatically restored to normal and the locking-means will be reset.

Figure 2:
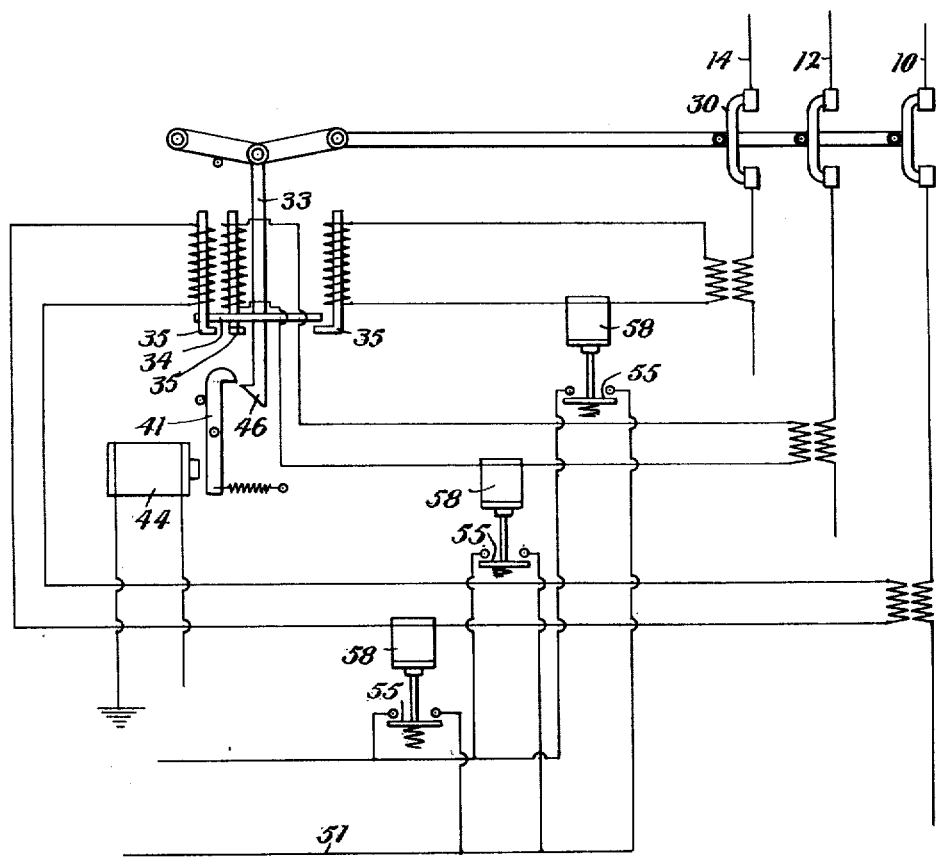

Figure 1 is a diagrammatical illustration of my invention, in connection with five sub-stations, it being understood that any number of sub-stations may be employed. Fig. 2 is a more complete diagrammatical view of the instruments and circuits at one of the sub-stations.

My invention is here illustrated by and in connection with an ordinary tri-phase system of electrical-distribution wherein 10, 12 and 14 represent the main wires, and 15, 16 and 17 feeder-wires leading therefrom at several sub-stations marked 20, 21, 22, 23 and 24. At each sub-station an overload switch is provided, represented at 30, which is adapted to be released or otherwise controlled in any usual or suitable manner by a tripping-magnet 31, arranged in a transformer-circuit 32, and it will be understood that each phase or wire may be provided with a like overload-switch and tripping-magnet arranged in a transformer circuit, those of one phase only being shown in Fig. 1, merely to simply illustrate the invention.

In Fig. 2 the overload-switches of the three wires or phases are connected together in the usual manner, and the actuator consists of a plunger 33, having a disk 34 secured to it, which is adapted to be engaged by the armatures 35 of several tripping-magnets, the operation of any one of which will cause the overload-switch to operate. The system thus briefly described is well known in the art.

In Fig. 1, the armature of each tripping-magnet 31 has a projection 40, adapted to be engaged by a latch 41, pivoted at 42, and having an extension 43, bearing the armature of a local-magnet 44, and said latch is normally held in its disengaged position, and the armature in its retracted position by a spring.

In Fig. 2 a projection 46, corresponding to the projection 40, is arranged on the plunger 33, and is adapted to be engaged by the pivoted latch 41, which is controlled by the local-magnet 44. When the local-magnet is energized the latch will be caused to engage and lock the armature of the tripping-magnet, or the plunger, thereby to prevent the tripping-magnet or magnets from operating.

Each local-magnet 44 is arranged in a circuit 50, and each circuit 50 extends from one to the next sub-station, so that a local-magnet which is arranged at one sub-station may have its controlling-means at the next sub-station throughout the system. Said circuits 50 may be constructed as branches from a pilot-wire 51, or as separate local circuits, or otherwise, the source of supply for said circuits being immaterial, although preferably being independent of the distribution system.

The local-magnet circuits 50 are separately controlled by means at the sub-stations which is responsive to an overload, but more quickly responsive than the tripping-magnets, and herein said local-magnet circuits have circuit-closers 55, which are normally open, and the movable members of which are connected with the armatures of controlling-magnets 58, which are arranged in series relation with the tripping-magnets in the transformer-circuits 32. Said magnets 58 may be made smaller than the tripping-magnets, so that they will be more quickly responsive, or they may be otherwise constructed for the accomplishment of this purpose.

Upon the occurrence of an overload, such for instance as may be caused by a short-circuit at 60, or a fault, such as a ground at 61, then, in such case, the tripping-magnets and the controlling-magnets at the sub-stations 20, 21 and 22 will be affected, but the controlling-magnets will operate first, and lock the tripping-magnets at sub-stations 20 and 21. The locking-means for the tripping-magnet at sub-station 22 is controlled by means located at sub-station 23, and will not be operated, for the reason that the controlling-means is located beyond the fault, hence the tripping-magnet at said sub-station 22 is free to operate and will do so, and cause its overload-switch to open the circuit.

Wherever the fault occurs it will be noted that the tripping-magnet nearest the cause, but between it and the source of supply will be operated, and all of the other tripping-magnets between said place and the source of supply will be prevented from operating, so that continuity of the service is maintained at those sub-stations not affected. Upon cessation of the overload the armatures on the controlling magnets will be restored to normal by springs 70 attached thereto, and the locking-means for the tripping-magnets will be automatically reset by the springs attached to the pivoted latches 41. Thus restoring all of the operating-means to normal automatically.

I claim:—

1. In an electrical-distribution system including several sub-stations, an overload-switch and tripping-magnet responsive to an overload, arranged at each sub-station, means to prevent operation of each tripping-magnet controlled by means located at the next sub-station and responsive to an overload, said controlling-means being more quickly responsive than the tripping-magnets, whereby those tripping-magnets which ordinarily would respond to an overload are prevented from operating except the one whose controlling-means is located beyond the cause of the overload and which does not respond, substantially as described.

2. In an electrical-distribution system including several sub-stations, an overload-switch and tripping-magnet responsive to an overload, arranged at each sub-station, locking-means to prevent operation of each tripping-magnet, controlling means for each locking-means arranged at a sub-station next the locking-means which it controls, said controlling-means being responsive to an overload but more quickly responsive than the tripping-magnets, substantially as described.

3. In an electrical-distribution system including several sub-stations, an overload-switch and tripping-magnet responsive to an overload, arranged at each sub-station, means to prevent operation of each tripping-magnet, a controlling-magnet for said means which is located at a sub-station next the means which it controls, and which is arranged in a transformer circuit in series relation with the tripping-magnet thereat, and which is more quickly responsive to an overload than the tripping-magnet, substantially as described.

4. In an electrical-distribution system including several sub-stations, an overload-switch and tripping-magnet responsive to an overload, arranged at each sub-station, electro-magnetically operated means to prevent operation of each tripping-magnet, a local-circuit for each electro-magnetically operated means extended to the next sub-station, a circuit-closer for each local-circuit at said next sub-station, and means responsive to an overload to operate said circuit-closer, said means being more quickly responsive than the tripping-magnet, substantially as described.

5. In an electrical-distribution system including several sub-stations, an overload switch and tripping-magnet responsive to an overload, arranged at each sub-station, electro-magnetically operated means to prevent operation of each tripping-magnet, a local-circuit for each electro-magnetically operated means extended to the next sub-station and having its source of supply independent of the distribution-system, a circuit-closer for each local-circuit at said next sub-station, and means responsive to an overload to operate said circuit-closer, said means being more quickly responsive than the tripping-magnet, substantially as described.

6. In an electrical-distribution system including several sub-stations, an overload switch and tripping-magnet responsive to an overload, arranged at each sub-station, a locking-device for the armature of each tripping-magnet, a local-magnet to operate each locking-device thereby to prevent operation of the tripping-magnet, a circuit for each local-magnet extended to the next sub-station, and controlling-means at said sub-stations to operate said local-magnet circuits which are responsive to an overload but more quickly responsive than the tripping-magnets, substantially as described.

7. In an electrical-distribution system including several sub-stations, an overload-switch and tripping-magnet responsive to an overload, arranged at each sub-station, means to prevent operation of each tripping-magnet controlled by means located at the next sub-station and responsive to an overload, said controlling-means being more quickly responsive than the tripping-magnets, and means to automatically restore said controlling-means upon cessation of the overload, thereby to permit automatic resetting of the means to prevent operation of the tripping-magnets, substantially as described.

8. In an electrical-distribution system including several sub-stations, an overload-switch and tripping-magnet responsive to an overload, arranged at each sub-station, locking-means to prevent operation of each tripping-magnet, controlling-means for each locking-means arranged at a sub-station next the locking-means which it controls, said controlling-means being responsive to an overload but more quickly responsive than the tripping-magnets, and means to automatically restore said controlling-means upon cessation of the overload, thereby to permit automatic resetting of the locking-means, substantially as described.

In testimony whereof, I have signed my name to this specification, in the presence of two subscribing witnesses.

GEORGE A. BURNHAM.

Witnesses:
B. J. NOYES,
H. B. DAVIS.

---

Copies of this patent may be obtained for five cents each, by addressing the "Commissioner of Patents, Washington, D. C."